United States Patent [19]
Pfiffner

[11] Patent Number: 5,623,518
[45] Date of Patent: Apr. 22, 1997

[54] METHOD AND CIRCUIT ARRANGEMENT FOR TRANSMITTING BINARY DATA TRAINS

[75] Inventor: Peter Pfiffner, Wil, Switzerland

[73] Assignee: Hani Prolectron AG, Bronschhofen, Switzerland

[21] Appl. No.: 47,193

[22] Filed: Apr. 16, 1993

[30] Foreign Application Priority Data

Apr. 23, 1992 [CH] Switzerland ............ 01 315/92

[51] Int. Cl.$^6$ .................. H04L 27/10; H03K 7/08
[52] U.S. Cl. .............. 375/278; 375/238; 375/258; 375/272; 370/212
[58] Field of Search ............... 375/222–223, 375/238, 257, 258, 272, 303, 334, 239, 278, 285, 296, 346, 348; 370/8–10; 341/52, 55, 73, 53; 329/300, 312, 313; 332/100, 109, 115, 112

[56] References Cited

U.S. PATENT DOCUMENTS

| | | | |
|---|---|---|---|
| 3,560,856 | 2/1971 | Kaneko | 375/292 |
| 3,697,874 | 10/1972 | Kaneko | 375/292 |
| 4,357,634 | 11/1982 | Chung | 375/239 X |
| 4,425,665 | 1/1984 | Stauffer | 375/223 |
| 4,489,222 | 12/1984 | Lusignan et al. | 375/222 |
| 4,627,078 | 12/1986 | Stoner | 375/272 |
| 4,644,561 | 2/1987 | Paneth et al. | 375/303 |
| 4,689,801 | 8/1987 | Nurczyk et al. | 375/223 |
| 4,871,987 | 10/1989 | Kawase | 375/303 |
| 4,896,335 | 1/1990 | Wong et al. | 375/295 |
| 4,926,444 | 5/1990 | Hamilton et al. | 329/300 |
| 5,068,874 | 11/1991 | Leitch | 375/278 |
| 5,103,463 | 4/1992 | Schoeneberg | 375/334 |
| 5,132,957 | 7/1992 | Mashimo | 375/238 X |
| 5,185,765 | 2/1993 | Walker | 375/238 |
| 5,202,900 | 4/1993 | Leitch | 375/278 |
| 5,227,741 | 7/1993 | Marchetto et al. | 375/223 |
| 5,237,590 | 8/1993 | Kazawa et al. | 375/293 |
| 5,406,584 | 4/1995 | Erisman | 375/272 |

FOREIGN PATENT DOCUMENTS

| | | |
|---|---|---|
| 0344615 | 12/1989 | European Pat. Off. . |
| 2008897 | 9/1971 | Germany . |
| 3133397 | 3/1983 | Germany . |
| 9102403 | 2/1991 | WIPO . |

OTHER PUBLICATIONS

International Telecommunications Symposium ITS '90, Rio de Janiero, BR, 03., –06.09.199, pp. 525–528, IEEE, New York, U.S.; XP245474; J.A. Delgado–Penin / A. Correas–Corcobado, entitled "Power Spectral Density Of A Novel Adaptive Multilevel Line Code".

IEEE Journal of Solid–State Circuits, Bd. 24, Nr. 6, Dec. 1989, New York, U.S. pp. 1614 to 1623 XP100493, by R.P. Colebeck et al., entitled "A Single–Chip 2B1Q U–Interface Transceiver".

"Datenübertragung (Data Transmission)", P. Bocker; vol. 2, pp. 30–32, Munich, Germany, 1976.

European Patent Office Search Report and Annex.

*Primary Examiner*—Young T. Tse
*Attorney, Agent, or Firm*—Greenblum & Bernstein P.L.C.

[57] ABSTRACT

A method and apparatus for transmitting binary data trains of 0 and 1 data bits, or combinations of these data bits over a communications network. The data bits are converted into pulses whose polarity changes from pulse to pulse, so as to enable an optimal exploitation of the transmission channel with a low error rate. The pulses generated by an apparatus of the present invention have a signal shape that produces a minimum inter-symbol interference. Processing and evaluation of the transmitted pulses are performed by a processor, so that a minimal error rate is attainable even under unfavorable transmission conditions.

28 Claims, 4 Drawing Sheets

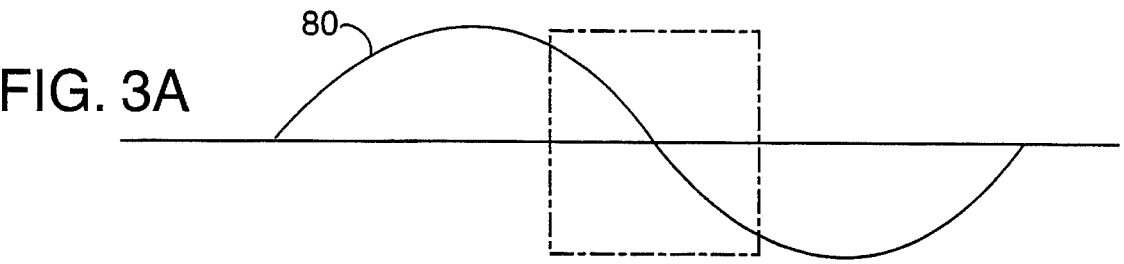
FIG. 3A
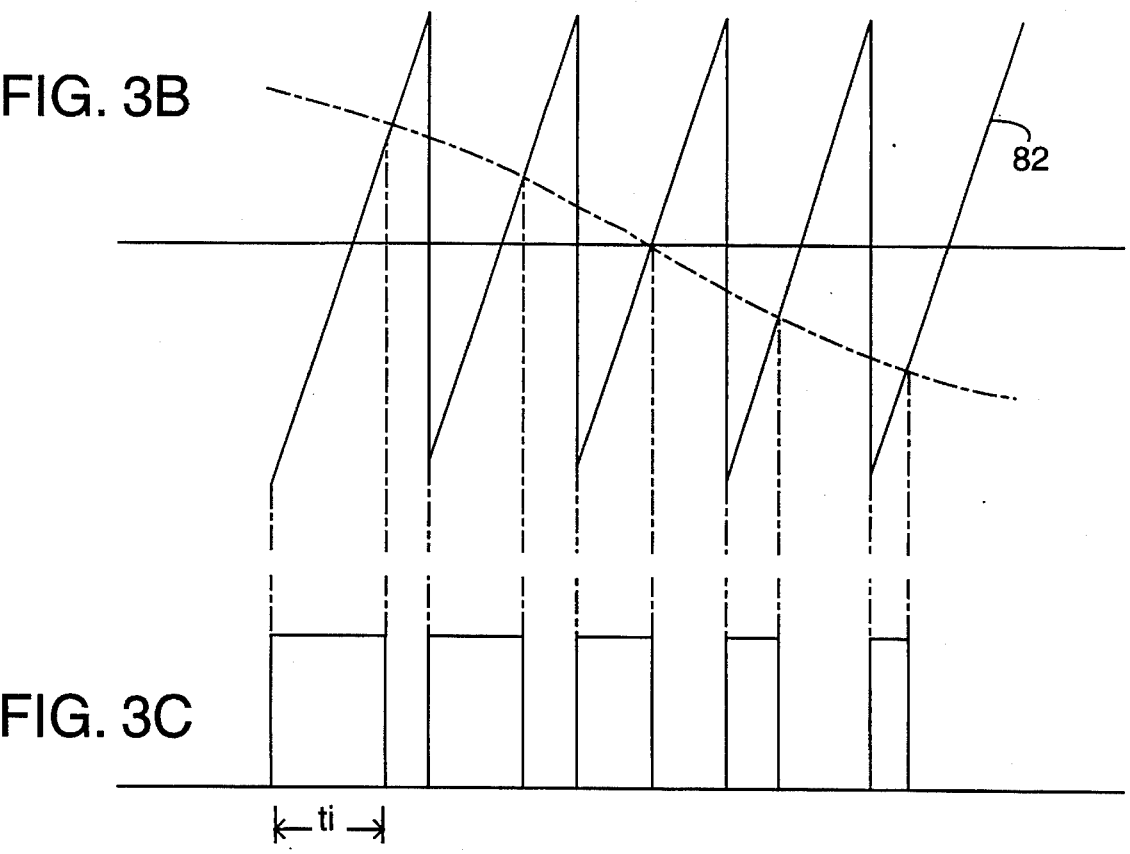
FIG. 3B
FIG. 3C
FIG. 3D
11000000  10100110  10000000  01100000  01000000
 (192)     (166)     (128)     (96)      (64)

METHOD AND CIRCUIT ARRANGEMENT FOR TRANSMITTING BINARY DATA TRAINS

BACKGROUND OF THE INVENTION

1. Field of the Invention

The present invention is directed to a method for transmitting data trains, and an apparatus for performing the method of transmitting data trains over a communications link.

2. Discussion of Background and Relevant Information

As illustrated in FIG. 4, when data terminal equipment 200, such as, for example, a computer, is used to transmit digital data to another computer over a communications link, such as, for example, a telephone network 210 or a radio relay 220, the digital data is usually converted to a low-frequency analog signal. While digital communication networks exist, the digital data usually is converted from a digital data stream to an analog data stream because the vast majority of communication networks operate in the analog domain. The device that is used to execute this conversion process is referred to as a modulator-demodulator (also known as a modem 230). The modem 230 serves to convert serial binary digital data to and from a signal form that is appropriate for a respective communication channel, such as the telephone network or radio relay.

The analog frequency of the converted digital data is changed, or shift-keyed, between two values fh and ft (where, fh>ft), depending on the logical states of the inputted signal. This transmission modulation method is referred to as a frequency shift keying (FSK) modulation method.

To transmit digital data over relatively long electrical, or optical, lines or by radio, the FSK-modulated low frequency signal is superimposed upon a high-frequency carrier channel. The receiving side then demodulates the high-frequency signal. The FSK-modulated low frequency signal is recovered, and then demodulated by a discriminator. Finally, the digital data stream is regenerated.

As noted above, the modulation and demodulation of the low frequency signal is typically performed by a modem. Such a modem is disclosed, for example, by P. Bocker, Datenübertragung [Data Transmission], Munich, 1976, Vol. 2, pp. 30–32. A review of page 31 and FIG. 7.10 of this document illustrates a frequency-shift-keyed oscillator that is provided with a resonant circuit, in which the natural frequency of the oscillator is varied as a function of the data to be transmitted. A review of page 32 and FIG. 7.12 illustrates a demodulator with a resonant circuit demodulator that functions to regenerate the transmitted data signal. Page 31 and FIG. 7.11 illustrates the data appearing in the modem.

According to the Bocker document, transmitted data representing a logical 1 has a frequency modulated signal of approximately 3.5 oscillations at a frequency fh, while transmitted data representing a logical 0 has approximately 1.5 oscillations at a frequency ft. Thus, the transmission rate (also referred to as the baud rate) of the transmitted data signal is approximately 3.5 times lower than frequency fh.

A high frequency signal fh leads to a correspondingly high bandwidth requirement in the modulation of the carrier channel. For a fixed bandwidth, the transmission rate is therefore limited to a relatively low value. Reducing the oscillations per data bit makes it possible to increase the transmission rate. However, if the frequency fh remains twice as high as the frequency ft, twice the bandwidth is needed to transmit the 1 data bits, as compared with that for the 0 data bits. According to the method by Bocker, the resultant transmission rate is always relatively low in comparison with the required bandwidth. Over the frequency range of a transmission system, the attenuation is often not constant and the phase often does not rise linearly with the frequency, so that signal deformations occur during transmission. If two frequencies fh and ft are used, group delay distortion occurs, leading to signal distortions that normally result in an increased error rate. Thus, the method of Bocker requires that the signal distortions be reduced using complicated and expensive equalizers.

German published, non-examined Patent Application DE-OS 2 008 897 discloses a method for transmitting binary-encoded data over a high-frequency channel, in which the binary encoding is done by a data-dependent shifting of the carrier frequency. In this document, a 0 data bit is represented by setting the carrier to a frequency f1, where f1 equals f0 and fa, while a 1 data bit is represented by setting the carrier frequency to a frequency f2, where f2 is equal to f0 minus fa, where frequencies f1, f0 and fa are distinct frequencies. This method permits one to achieve a substantially higher transmission rate in the baseband range as compared with the frequency shift keying method (described above). Radio equipment provided with carrier frequency shifting are able to transmit data signals in digital form. However, in order to accomplish this carrier shift keying, the radio must be provided with special provisions that are not normally found in commercially available equipment. Moreover, this type of modulation can have an unacceptably high error rate, because of the non-linearities and shift of a discriminator characteristic curve. For example, FIG. 1A of the present specification illustrates an upper binary signal that comprises a non-return to zero (NRZ) signal. When such a transmission contains a long series of 0 data bits or 1 data bits, the resultant signal does not provide information which is required to maintain a correct decision threshold in a discriminator. Consequently, the decision threshold may shift and 1 data bits may be detected as 0 data bits. The present invention overcomes this limitation, by employing, for example, a ternary signal, in which zero-crossings occur between two 0 data bits. Accordingly, a clock regeneration and decision threshold correction can be easily achieved.

Moreover, the method described by German published, nonexamined Patent Application DE-OS 2 008 897 requires that the binary data signal must be delivered to the modulator via a dc-coupled input. However, telephone network interface regulations of numerous countries prohibit the introduction of a dc voltage signal upon the country's communication network, so as to keep allowed frequency channels free of harmonics that would be delivered via such inputs and be modulated on the carrier channel.

SUMMARY OF THE INVENTION

Accordingly, it is an object of the present invention to develop an apparatus and method for transmitting data signals over a transmission channel at an optimal transmission rate and to reduce the occurrence of data transmission errors.

According to a preferred embodiment of the present invention, there are three independent data train transmission possibilities. For example, in a first possibility, pulses of alternating polarity can be transmitted for all 1 data bits, while no pulses are transmitted for 0 data bits. Accordingly, the binary data train is converted into a plurality of pulses whose polarity changes from one pulse to the next pulse, such that for each 1 data bit, a pulse is transmitted. The transmitted pulses are then converted at the receiving station into their original data bits.

Alternatively, in a second possibility, pulses of alternating polarity can be transmitted for all 0 data bits, while no pulses are transmitted for 1 data bits. Accordingly, the binary data train is converted into a plurality of pulses whose polarity changes from one pulse to the next pulse, such that for each 0 data bit, a pulse is transmitted. The transmitted pulses are then converted at the receiving station into their original data bits.

Further, in a third possibility, pulses of alternating polarity can be transmitted for combinations of 0 and 1 data bits. Accordingly, the binary data train is converted into a plurality of pulses whose polarity changes from one pulse to the next pulse. Pulses representing combinations of data bits are transmitted to a receiving station, such that pulses of different amplitudes are provided for at least two of the bit combinations represented as 11, 10, 01, and 00. The transmitted pulses are then converted at the receiving station into their original data bit combinations.

Thus, the present invention can be defined as a method for transmitting a binary data train of 0 data bits or 1 data bits or combinations of 0 and 1 data bits, comprising the steps of:

converting the binary data train into a plurality of pulses whose polarity changes from one pulse to a next pulse;

transmitting pulses representing one of 0 data bits, 1 data bits, and combinations of 0 and 1 data bits, to a receiving station, the combinations of data bits being provided such that pulses of different amplitudes are transmitted for at least two of the bit combinations represented as 11, 10, 01, and 00; and converting the transmitted pulses at the receiving station into their original data bits or data bit combinations.

According to the present invention, the step of converting the pulses into their original bit combinations comprises synchronizing a clock generator upon a reception of each pulse. A feature of the present invention is that the clock generator synchronizes the clock generator after n data bits. At least one synchronizing pulse is transmitted at a time to synchronize the clock generator.

According to the method of the present invention, the step of transmitting pulses comprises converting a sequence of data words into corresponding pulse width modulated pulses, which are subsequently converted into one output pulse and transmitted. A feature of this invention is that the data words can be examined to determine what kind of data bit or data bit combination is contained in the transmitted pulses. Accordingly, when a low baud rate, or transmission of single data bits, takes place, the present invention determines whether the received pulse comprises a noise-signal or a data bit. Alternatively, when a high baud rate, or transmission of combinations of data bits, takes place, the present invention determines whether the received pulse comprises a noise-signal or a combination of data bits, and if the received pulse is a combination of data bits, what data bit combination it is.

The method of the present invention provides for the shaping of the pulses prior to their transmission, over, for example, a radio network (Radio Relay), so as to minimize the occurrence of an inter-symbol interference and interfering harmonics. The radio network has a carrier frequency that is frequency modulated in accordance with a signal shape and amplitude of the transmitted pulses. Conversely, the radio network has a carrier frequency that is phase modulated in accordance with a signal shape and amplitude of the transmitted pulses.

According to the present invention, an apparatus is disclosed for exchanging a binary data train of 0 data bits or 1 data bits or combinations of 0 and 1 data bits over a communications network between two data equipment devices, comprising:

a modulator that comprises:
  a processor that converts data into data word sequences;
  a digital/analog converter that is connected to an output of the processor and which converts a digital data stream into a half-wave analog signal stream;
  a first bandpass filter that is connected to an output of the digital/analog converter; and
  a first transformer that is connected to an output of the first bandpass filter and to a communications network having at least one transmission channel.

The apparatus further comprises a demodulator, the demodulator comprising:

a second transformer that is connected to the communications network;

a second bandpass filter that is connected to an output of the second transformer; and a comparator that is connected to an output of the second bandpass filter to determine whether a signal outputted by the said second bandpass filter exceeds a predetermined threshold, an output of the comparator being inputted to the processor.

According to the present invention, an apparatus is disclosed for exchanging a binary data train of 0 data bits or 1 data bits or combinations of 0 and 1 data bits over a communications network between two data equipment devices, comprising:

first means for converting, such as a processor or a digital signal processor, a binary data train into a plurality of pulses whose polarity changes from one pulse to a next pulse;

means for transmitting pulses representing one of 0 data bits, 1 data bits, and combinations of 0 and 1 data bits, to a receiving station, the combinations of data bits being provided such that pulses of different amplitudes are transmitted for at least two of the bit combinations represented as 11, 10, 01, and 00; and second means for converting the transmitted pulses at a receiving station into their original data bits or data bit combinations.

A feature of the present invention is that the digital signal processor comprises a processor, a counter that is interfaced to the processor, a pulse width modulator that is interfaced with the counter, and a pulse width demodulator that receives a signal from the pulse width modulator.

An apparatus for exchanging a binary data train of 0 data bits or 1 data bits or combinations of 0 and 1 data bits over a communications network between two data equipment devices according to the present invention is disclosed that comprises:

a data bus;

a processor that converts data that arrives over the data bus into data word sequences;

means for converting the data word sequences into an analog half-wave signal;

means for minimizing a harmonic wave; and means for coupling the analog signal to a communications link, the half-wave signal comprising either a positive half-wave signal, or a negative half-wave signal.

A feature of the present invention is that the coupling means comprises either a transformer, or a pulse width demodulator, while the converting means comprises a digital-to-analog converter.

According to the present invention, an apparatus for exchanging a binary data train of 0 data bits or 1 data bits or combinations of 0 and 1 data bits over a communications network between two data equipment devices comprises:

a data bus;

a processor that is connected to the data bus;

a counter that exchanges data with the processor;

a pulse width modulator that exchanges data with the counter;

means for coupling the pulse width modulator to the communications network; and a controller that controls the processor and the counter.

A feature of this invention is that the coupling means comprises either a transformer or a pulse width modulator. Another feature of the present invention is that the apparatus further comprises an optical coupler that is located between the pulse width modulator and the coupling means. The present invention further comprises means for receiving data from a second one of the two data equipment devices, and a second counter that accepts the data received by the receiving means, the second counter producing a signal that is supplied to the processor. In addition, the receiving means comprises either a second transformer or a second pulse width modulator.

According to a variation of the present invention, the apparatus further comprises a second optical coupler that is located between the second pulse width modulator and the second counter. A third optical coupler can also be provided that is located between the second pulse width modulator and the controller.

A feature of this invention is the inclusion of a means for receiving data, such as a second pulse width modulator, from a second one of the two data equipment devices, and means for switching the counter between the receiving means and the pulse width modulator. The present invention is useable on communication networks that comprise a radio relay, having at least one frequency-modulatable carrier frequency channel, or at least one phase-modulatable carrier frequency channel.

An advantage of the present invention is the' ability to perform data transmissions using commercially available communication equipment, without any specific modification, or at most, only a minor modification to the equipment.

Another advantage of the present invention is that the data signal to be transmitted is deliverable to the radio via an alternating voltage input (i.e., no dc coupling required).

According to an object of the present invention, a method is disclosed wherein a transmission rate is attainable that is two or four times as high as the frequency of the signal with which the carrier signal is modulated. Such an arrangement provides an optimal ratio of the transmission rate to the channel bandwidth.

According to an advantage of the present invention, a signal that is modulated with binary data employs a single frequency signal. Thus, distortion from non-linear group delay times is eliminated. As a result, the transmission error rate is reduced, without having to use costly and complicated equalizers, as is required by the prior art methods.

As noted above, the method of the present invention can be used in combination with conventional radio equipment. This permits radios that are already in use to be operated with the newly invented method without requiring additional provisions. The transmission rate of such conventional equipment can be increased for a fixed predetermined bandwidth, while simultaneously reducing the transmission error rate. It is even possible to increase the transmission rate still further (i.e., by a factor of 4) by means of further provisions, given a sufficiently good signal-to-noise ratio, as will be described below with reference to FIG. 1C.

According to an object of the present invention, a circuit arrangement is disclosed that enables a modulation and demodulation of a baseband signal. The circuit arrangement is economical in design, and permits optimal shaping of the data signals to be transmitted and optimal detection of the transmitted signals. In addition, the presently disclosed circuit arrangement largely eliminates transmission errors that are caused by interference in conventional discriminator stages.

BRIEF DESCRIPTION OF THE DRAWINGS

The foregoing and other objects, features, and advantages of the present invention will be apparent from the following more particular description of a preferred embodiment, as illustrated in the accompanying drawings which are presented as a non-limiting example, in which reference characters refer to the same parts throughout the various view, and wherein:

FIGS. 3A–3D illustrate signal sequences in modems provided with signal processors.

DESCRIPTION OF THE PREFERRED EMBODIMENTS

Figure 1A:
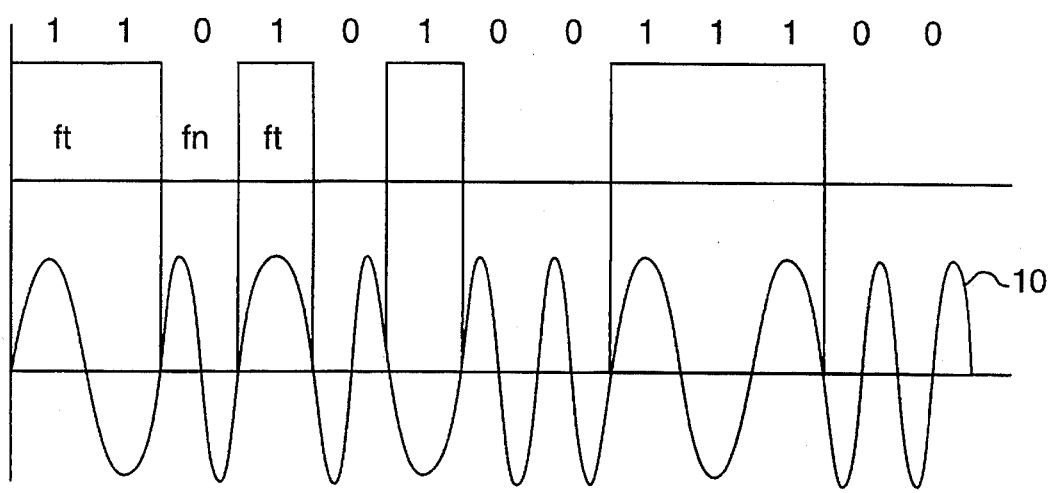
FIGS. 1A–1C illustrate various signal sequences.

FIG. 1A illustrates a data signal bit train 1101010011100 that is to be transmitted, and an FSK-modulated baseband signal 10 that corresponds to the bit train, in which a 1 data bit is represented by a first frequency signal and a 0 data bit is represented by a second frequency signal, in which the first frequency signal is lower than the second frequency signal. According to this illustration, the 1 data bit is assigned a half-wave at a frequency ft, and the 0 data bit is assigned two half-waves at a frequency fh. If a half-wave is sufficient for transmitting a 1 data bit, then, by the assignment of two half-waves for transmitting a 0 data bit, the resulting transmission rate is evidently not optimal. Further, because of the use of signal components of different frequencies ft and fh, group delay distortion occurs, leading to signal distortion.

Figure 1B:
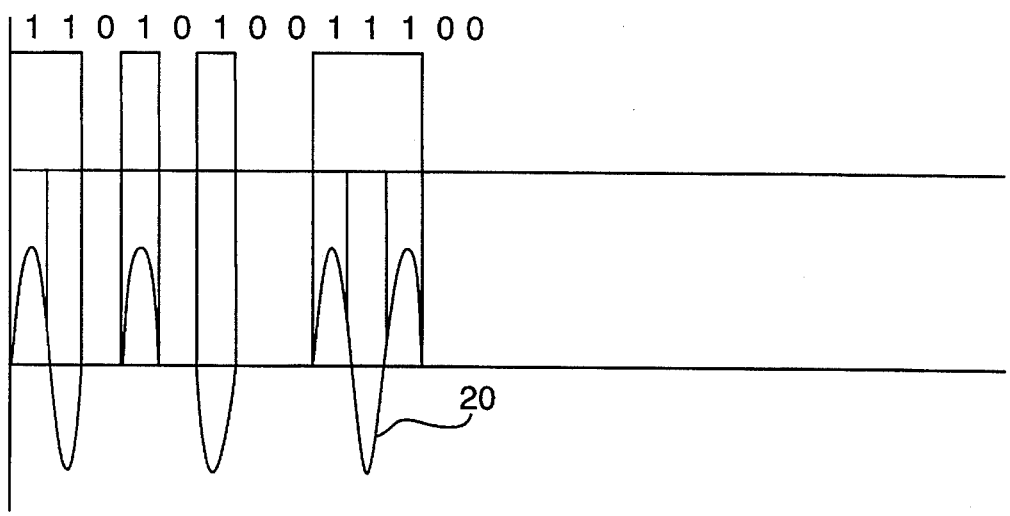

In FIG. 1B, a baseband signal 20 is formed in accordance with a bit train 1101010011100 shown in FIG. 1A. According to FIG. 1B, the 1 data bit is assigned a positive or negative half-wave, for instance at the frequency fh. Provision is made for a polarity change to take place from one half-wave to the next half-wave. The 0 data bits are assigned a direct voltage component of 0 V. Instead of the half-waves shown, narrow-band frequency spectrum pulses, in which only "soft" transitions are provided, are often used in order to reduce inter-symbol interference and harmonics that can arise from relatively "hard" transitions between 0 and 1 data bits. This allows limiting the bandwidth of the transmission channel to a relatively low value, without the occurrence of pulse distortion. Preferably, raised cosine pulses are used, which meet the above-described requirements. The modulated baseband signal shown in FIG. 1B, therefore, includes only signal components of frequency fh. Thus, group delay distortion and corresponding signal distortions are eliminated. Accordingly, distortion corrector stages, which would be required with the data transmission scheme of FIG. 1A, are unnecessary with the data transmission scheme of FIG. 1A. Moreover, the data transmission scheme of FIG. 1B results in a reduced data transmission error rate. Since the transmission of the 0 and 1 data bits take only the length of one half-wave of frequency fh, or time T=1/(2fh), respectively, the data transmission rate of the scheme of FIG. 1B is twice that of the data transmission scheme of FIG. 1A. That is, the data transmission rate of the method of FIG. 1B is equivalent to a value of 2fh.

Figure 1C:
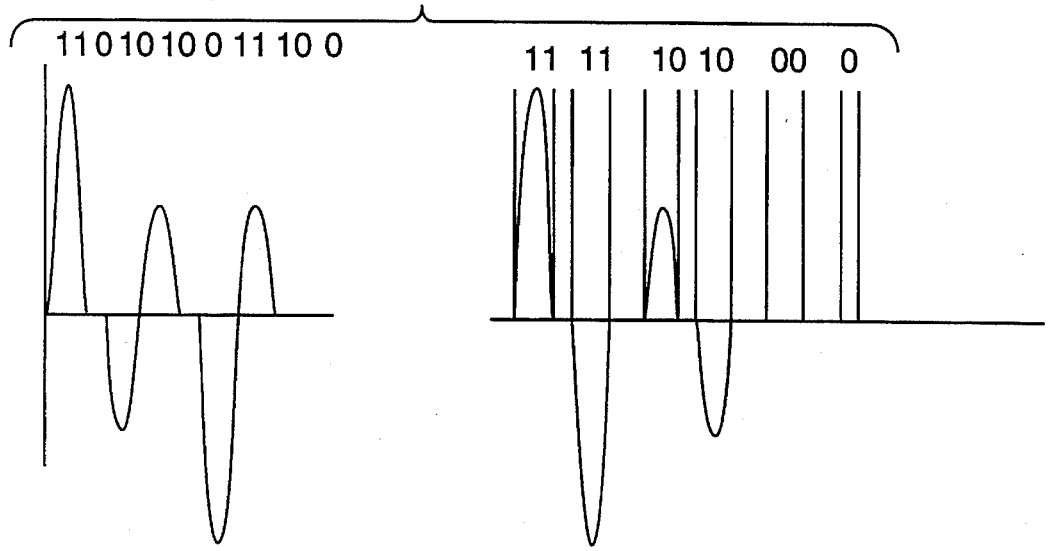

FIG. 1C illustrates that the transmission rate can be increased even more than that shown in FIG. 1B. According to the data transmission of FIG. 1C, two half-waves, or pulses, of different amplitude are provided, with which the baseband signal is modulated in accordance with a bit combination 11, 10 and 0, or 11, 01 and 0. Bit combinations 11 and 10, or 11 and 01, respectively, are assigned half-waves of different amplitude, and the bit 0 is assigned a signal component of 0 V that is half the length of a half-wave. It is noted that the 0 and 1 data units may be transposed without departing from the scope of the present invention.

In FIG. 1C, a half-wave with an amplitude of 1 is assigned to the combination 11, and a half-wave with an amplitude of 0.5 is assigned to the combination 10. A transmission rate twice as high as with the modulation method shown in FIG. 1B can be attained with the modulation method shown in FIG. 1C, which results in a transmission rate that is four times as high as compared with the modulation method shown in FIG. 1A. Accordingly, it is desirable to provide suitable decision thresholds, or decision criteria, for different amplitude signals, in the associated demodulation stage of the modem.

Figure 2A:
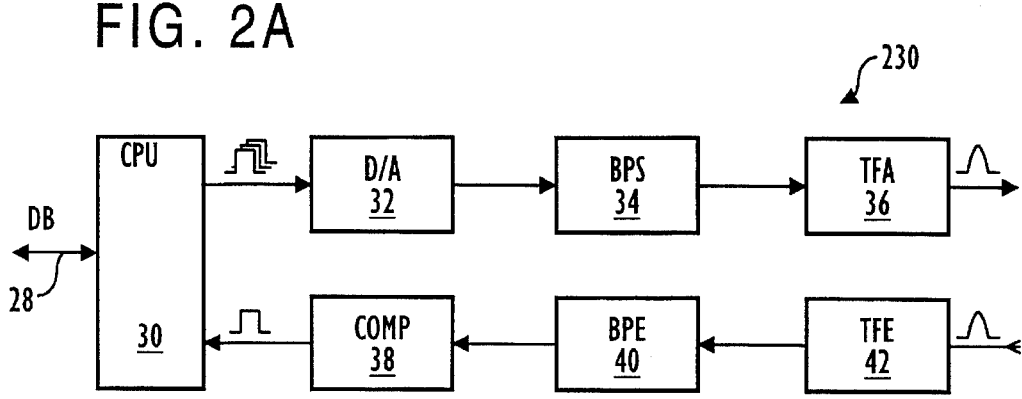
FIGS. 2A–2C illustrate modulator and demodulator units (modem) according to the present invention.
Figure 4:
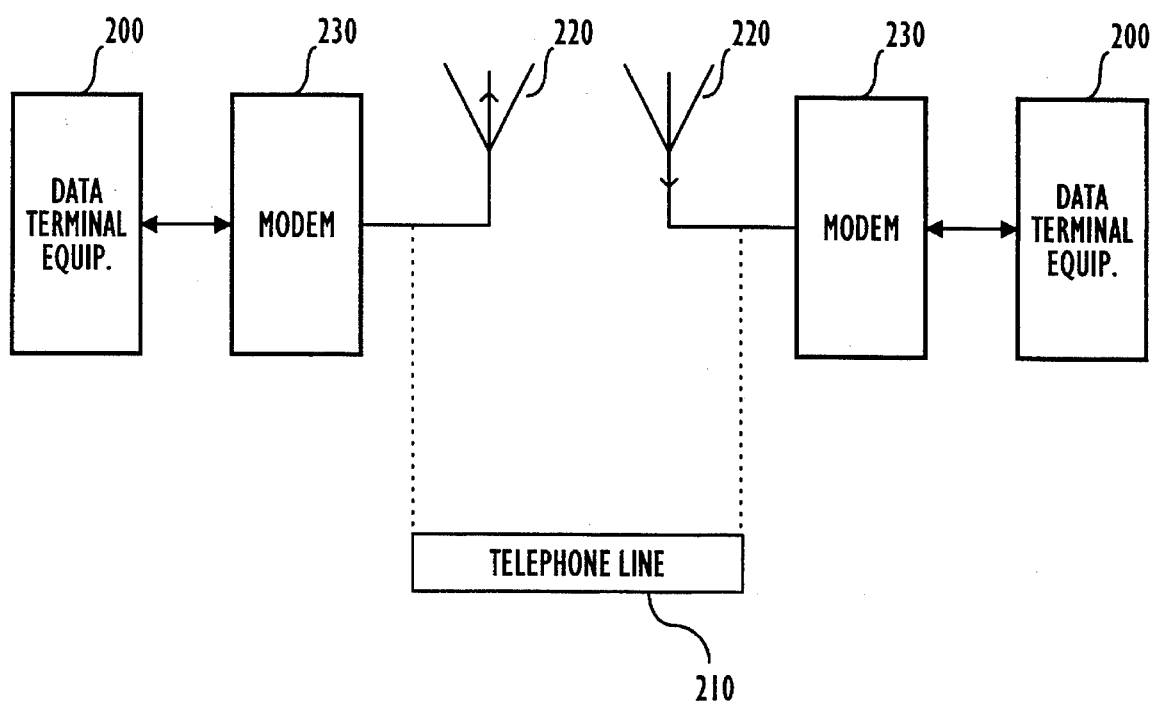
FIG. 4 illustrates an arrangement for transmitting data over a telephone network or radio relay.

FIG. 2A illustrates a circuit arrangement of a modem 230 according to a preferred embodiment of the present invention, for modulating and demodulating a baseband signal. The modem 230 of FIG. 2A is connected to a transmission line (FIG. 4) such as a telephone line 210 or a radio Relay (Network) 220, which, in accordance with the regulations of various countries governing the transmission of data signals, normally permits only an alternating voltage input and output to be used. With such an arrangement, data transmissions are possible when the receiving side of a transmission chain has a modem that uses the identical data transmission method.

According to the embodiment of FIG. 2A, a bi-directional data bus (DB) 28 is connected to an input of a central processing unit (CPU) 30. A digital/analog converter (D/A) 32 is connected to an output of the central processing unit 30, the output of which is connected to an input of a first bandpass filter (BPS) 34. The output of the bandpass filter 34 is connected to an output transformer (TFA) 36, which is connected to an input of a communications link, such as, for example, a radio Relay 220. An output of the communications link is connected to the central processing unit 30 via a comparator (COMP) 38, a second bandpass filter (BPE) 40 and an input transformer (TFE) 42.

Data arriving over the data bus 28 are converted by the central processing unit 30 into sequences of data words and applied to the D/A converter 32 using the data transmission method described above so that a positive or negative half-wave is outputted in alternation at the output of the D/A converter 32 for each 1 data bit. The first bandpass filter 34 eliminates any harmonic waves that may occur before the produced analog signal is outputted via the output transformer 36 to the ac voltage input of the communication link (e.g., radio), so as to avoid interference with adjacent radio channels.

A modulation of the carrier signal takes place in the radio that is proportional to the inputted signal. For example, if a carrier channel bandwidth is 5 kHz, a deviation of ±2.5 kHz around the mean frequency of the carrier results, at a maximum amplitude of the positive or negative half-wave of the analog signal. Signals received by the radio are demodulated and inputted to the input transformer 42 via an associated ac voltage output. The inputted signal is filtered by the second bandpass filter 40, so that a low-frequency analog signal is delivered to the comparator 38. The comparator 38 compares positive and negative half-waves of the inputted signal with corresponding threshold values and outputs a 1 data bit to the central processing unit 30 if a threshold is exceeded.

A disadvantageous feature of the presently described circuit is that the weighting criteria of the comparator 38 is unsatisfactory if the received signal contains noise or interference. If noise components or interference peaks exceed the threshold value, then a 1 data bit will be outputted to the central processing unit 30 by the comparator 38. Moreover, the central processing unit 30 and the D/A converter 32 can only approximate the desired pulse shapes, resulting in the possibility that, for instance, inter-symbol interference may be inadequately suppressed.

Figure 2B:
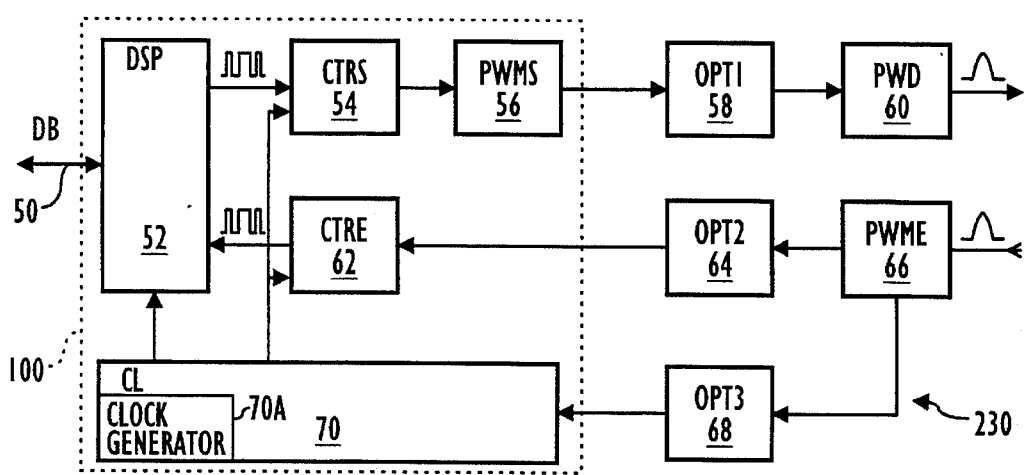

To over-come the above-described disadvantages, a second embodiment of a modem according to the present invention is illustrated FIG. 2B. According to this embodiment, data to be transmitted is connected to the input of the radio via a data bus DB that is interfaced to a digital signal processor (DSP) 52, a first counter (CTRS) 54, a first pulse width modulator (PWMS) 56, a first optical coupler (OPT1) 58 and a pulse width demodulator (PWD) 60 and to the output of the radio via the signal processor 52, a second counter (CTRE) 62, a second optical coupler (OPT2) 64, and a second pulse width modulator (PWME) 66. Moreover, the second pulse width modulator 66 is interfaced to a third optical coupler (OPT3) 68, which is interfaced to a control unit (CL) 70, which is also connected to the digital signal processor 52 and the first and second counters 54 and 62. The digital signal processor 52 has an expanded bus structure, compared with conventional processors. As a result, various operations (such as, for example, calculations, reading and writing processes) can be simultaneously performed. Digital signal processors of this kind, which have a very high operating speed, are especially well-suited to data signal processing.

Figure 2C:
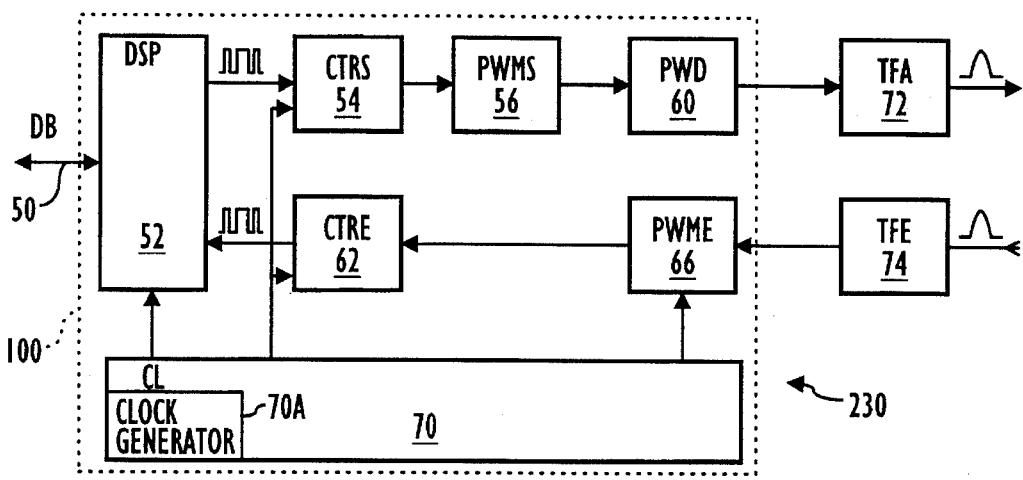

A third embodiment of the present invention is illustrated in FIG. 2C. The circuit arrangement of FIG. 2C is identical in function to the circuit arrangement of FIG. 2B. However, dc voltage decoupling of the input and output of the modem is done via two transformers (TFA) 72 and (TFE) 74.

The function of the circuit arrangement illustrated in FIG. 2B will be described with reference to FIGS. 3A to 3C. In accordance with the data arriving over the data bus 50, data words are outputted in serial, or parallel fashion, to the first counter 54 by the digital signal processor 52. These words determine how high the counter should run before it is reset. The first pulse width modulator 56, which is connected to the output of the first counter 54, produces a square wave signal having a duty cycle that is varied in such a way that the width of the square wave signals, or the pulse duration, is always selected to suit the data words outputted by the digital signal processor 52. In other words, the leading and trailing edge of the square wave pulse are each set at the starting and stopping time, respectively, of the first counter 54.

The first counter 54 can be synchronized with the first modulator 56 in various ways. For instance, the start and stop signals that determine the pulse width may be outputted to the first modulator 56. Alternatively, only the stop signals of the first counter 54 may be outputted to the first modulator 56. In the first case, the first counter 54 only needs to be synchronized with a reference frequency, otherwise, the first counter 54 and the first modulator 56 should be periodically clocked by the control unit 70. The modulated square wave signal, or the modulated pulses, are subsequently outputted to the demodulator 60 via the first optical coupler 58, which converts the pulses into an analog signal.

In FIG. 3B, 8-bit data words outputted by the digital signal processor DSP are shown, which determine how high the counter should run, and which, in a known manner, can assume decimal values between 0 and 255. It is understood that high resolutions can be achieved by employing 16-bit or 32-bit words without departing from the scope or spirit of the present invention. The first counter CTRS, which (for 8-bit words) can count to a maximum of 255 within the period of the square wave signal, counts up to the counter state set by the data word. The elapsed time for this purpose then corresponds precisely to a pulse duration ti. As a result, the width of the pulses shown in FIG. 3C is fixed. In the demodulator PWD, the square wave signals are filtered via a filter (i.e., a nth order low-pass filter, not shown), producing the analog signal 80 shown in FIG. 3A, which is outputted by the demodulator PWD to the radio. The digital signal processor DSP thus enables arbitrary pulse shapes to be generated, which results in the attainment of a low inter-symbol interference. A sequence of 8-bit data words that are read out whenever a 1 data bit to be transmitted appears is therefore stored in memory in the digital signal processor DSP. According to the embodiment of FIG. 2B, decimal values of 128 to 255 (for 8-bit data words) are provided for positive pulses, and values of 0 to 127 are provided for data words for negative pulses.

The width of the pulses are therefore set in the transmission path as a function of the data words present. By contrast, in the reception path, the determination of the pulse width is done as a function of an analog signal that is outputted by the radio. By comparing a sawtooth voltage 82, shown in FIG. 3B, with the analog signal delivered to the demodulator PWME by the radio, the pulse width ti of the square wave pulses at a given time is determined. The intersection of the two signals produces the trailing edge of the modulated pulses. The leading edges of the two signals (e.g., the sawtooth signal and the square wave signal) and the beginning of the starting, or trigger signal, for the second counter CTRE connected to the output side are synchronized in turn.

The second counter CTRE 62 begins to count upon the appearance of the leading edge of the square wave pulse. Once the pulse duration ti elapses, the second counter CTRE 62 is stopped by the trailing edge of the square wave signal. The counted value, which (as previously noted) for 8-bit data words is between 0 and 255, is then transferred by the second counter CTRE 62 to the digital signal processor DSP. Thus, the pulses that are received by the communication link (radio) are converted by the receiving circuit, described above, into a sequence of 8-bit data words and delivered to the digital signal processor DSP, which processes and evaluates the received data words. Accordingly, extreme variations in individual pulse widths, or corresponding data words, that result from a transmission interference, can be averaged out and corrected.

In other words, interference peaks, which, in the comparator circuit COMP 38 of FIG. 2A would be converted into 1 data bits, normally falsify only one pulse of the total sequence, which can be easily corrected by the circuits illustrated in FIGS. 2B and 2C. Thus, the circuit arrangements of FIGS. 2B and 2C operate to substantially reduce (or eliminate) transmission errors that may arise as a result of the data transmission process. As a result, data transmissions over relatively long distances, or under unfavorable conditions, become possible.

It is noted that the three optical couplers 58, 64, and 68, shown in the embodiment of FIG. 2B, function to decouple a dc voltage from the input and output of the modem.

Figure 2D:
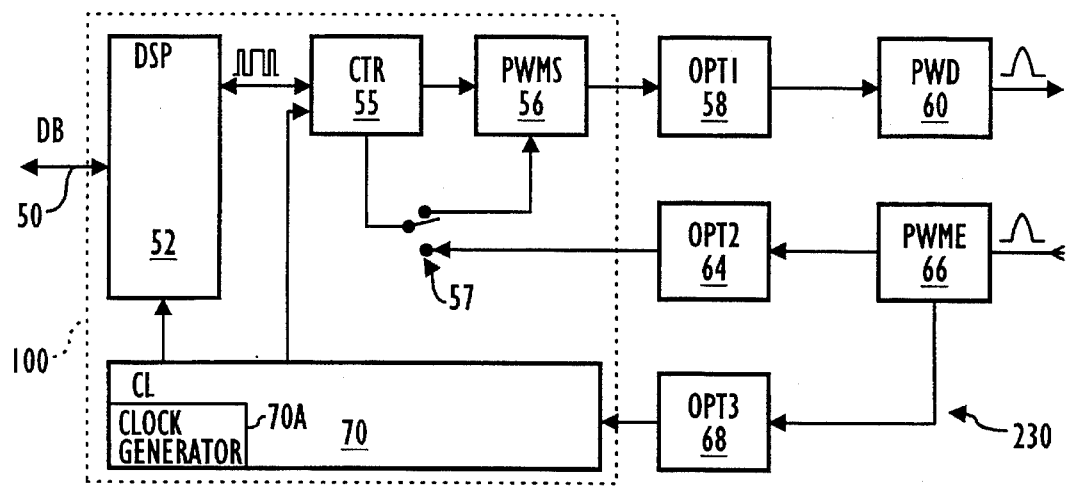

It is also noted that the first and second counters 54 and 62 can be replaced by a single counter (as shown in FIG. 2D) CTR 55 that is switched by switch 57 between the pulse width modulator 56 and the receiver and which operates in a time division multiplex mode, thus further reducing the complexity and cost of the apparatus. Further, the functions of the first and second counters CTRS 54 and CTRE 62, and the pulse width modulator PWMS 56 can be integrated into the digital signal processor DSP 52. For example, the dashed box 100, shown in FIG. 2B, indicates that the functions of the control unit 70, the first and second counters 54 and 62, and the pulse width modulator 56 are performed by a software programming of the digital signal processor 52.

Regeneration of a clock signal, with which a sequence of signal samplings or data words to be transferred to the digital signal processor DSP can be controlled, can be done in various ways. It is advantageous to output a few synchronizing pulses, which activate a clock generator 70a that is preferably provided in the control unit CL. To prevent a divergence of the clock cycles of the generator and of the transmitted signals, a provision is made for the clock generator 70a to be newly activated with each received pulse. Also, to prevent a divergence of the clock cycles if a relatively long series of 0 data bits is transmitted, a synchronizing pulse can be inserted after each nth data bit.

While the invention has been particularly shown and described with reference to the preferred embodiments thereof, it is understood by those skilled in the art that various alterations in form and detail may be made without departing from the spirit and scope of the invention, as defined by the following claims.

What is claimed is:

1. A method for transmitting a binary data train of 0 data bits or 1 data bits, comprising the steps of:

generating an encoded baseband signal by converting the binary data train into a plurality of pulses whose polarity changes from one pulse to a next pulse, such that for each 1 data bit a pulse is generated while for each 0 data bit the pulse is returned to zero, or, alternatively, for each 0 data bit a pulse is generated while for each 1 data bit the pulse is returned to zero;

shaping the pulses prior to transmission so as to minimize an occurrence of an inter-symbol interference and interfering harmonics; and transmitting the shaded pulses over a communication channel to a receiving station;

the receiving station comprising the step of:

converting the transmitted shaped pulses into the original binary data train of 0 data bits or 1 data bits with the aid of a synchronized clock signal.

2. The method of claim 1, wherein:

the step of converting the transmitted shaped pulses into the original binary data train comprises the step of synchronizing clock generator after a predetermined number of data bits, and wherein at least one synchronizing pulse at a time is transmitted, by which the clock generator is synchronized.

3. The method of claim 1, wherein:

the step of transmitting pulses comprises converting a sequence of data words into corresponding pulse width modulated pulses and subsequently into one output pulse that is transmitted.

4. The method of claim 3, wherein:

the step of converting the sequence of data words into corresponding pulse width modulated pulses comprises converting each transmitted output pulse into a sequence of correspondingly pulse width modulated pulses and subsequently into a corresponding sequence of data words; and examining the sequence of data words to determine what kind of data bit or data bit combination is contained in the transmitted pulses.

5. The method of claim 1, wherein:

the step of converting the pulses comprises converting each transmitted output pulse into a sequence of correspondingly pulse width modulated pulses and subsequently into a corresponding sequence of data words; and examining the sequence of data words to determine what kind of data bit or data bit combination is contained in the transmitted pulses.

6. The method of claim 1, wherein:

the step of transmitting pulses to the receiving station comprises transmitting pulses over a radio network.

7. The method of claim 1, wherein:

the step of transmitting pulses to the receiving station comprises transmitting pulses over a radio network having a carrier frequency that is frequency modulated in accordance with a signal shape and amplitude of the transmitted pulses.

8. The method of claim 1, wherein:

the step of transmitting pulses to the receiving station comprises transmitting pulses over a radio network having a carrier frequency that is phase modulated in accordance with a signal shape and amplitude of the transmitted pulses.

9. An apparatus in which a binary data train of 0 data bits or 1 data bits or combinations of 0 and 1 data bits is transferred over a communications network with further data equipment devices, comprising:

a processor that converts the binary data train into a plurality of pulses whose polarity changes from one pulse to a next pulse, said processor comprising:

a digital signal processor;

a counter that is interfaced to said digital signal processor;

a pulse width modulator that is interfaced with said counter; and a pulse width demodulator that receives a signal from said pulse width modulator;

means for transmitting pulses representing one of 0 data bits, 1 data bits, and combinations of 0 and 1 data bits, to a receiving station over the communications network, said combinations of data bits being provided such that said pulses have different amplitudes and are transmitted for at least two of the bit combinations represented as 11, 10, 01 and 00; and means for converting the transmitted pulses at said receiving station into their original data bits or data bit combinations.

10. An apparatus in which a binary data train of 0 and 1 data bits is transferred over a communications network with further data equipment devices, comprising:

a data bus;

a processor connected to said data bus;

a counter that counts data received from said processor;

a pulse width modulator that transmits data received from said counter;

means for coupling said pulse width modulator to said communications network; and a controller that controls said processor and said counter.

11. The apparatus of claim 10, wherein:

said means for coupling comprises a transformer.

12. The apparatus of claim 10, wherein:

said means for coupling comprises a pulse width demodulator.

13. The apparatus of claim 10, further comprising:

an optical coupler that is located between said pulse width modulator and said means for coupling.

14. The apparatus of claim 10, further comprising:

means for receiving data from a second further equipment device; and a second counter that accepts said data received by said means for receiving, said second counter producing a signal that is supplied to said processor.

15. The apparatus of claim 14, wherein:

said means for receiving comprises a second transformer.

16. The apparatus of claim 14, wherein:

said means for receiving comprises a second pulse width modulator.

17. The apparatus of claim 16, further comprising:

a second optical coupler that is located between said second pulse width modulator and said second counter.

18. The apparatus of claim 17, further comprising:

a third optical coupler that is located between said second pulse width modulator and said controller.

19. The apparatus of claim 10, further comprising:

means for receiving data from a second further equipment device; and means for switching said counter between said means for receiving and said pulse width modulator.

20. The apparatus of claim 19, wherein:

said means for receiving comprises a second pulse width modulator.

21. The apparatus of claim 10, wherein:

said communications network comprises a radio relay.

22. The apparatus of claim 21, wherein:

said radio relay has at least one frequency-modulatable carrier frequency channel.

23. The apparatus of claim 21, wherein:

said radio relay has at least one phase-modulatable carrier frequency channel.

24. A method for transmitting a binary data train of 0 data bits or 1 data bits, comprising the steps of:

generating an encoded baseband-signal by converting the binary data train into a plurality of pulses whose polarity changes from one pulse to a next pulse;

rearranging the 0 data bits and the 1 data bits in such a way that a data train of dual-bit-units containing 11 or 00, dual-bit-units containing 10 or 01 and single-bit-units containing 0 or 1 are formed;

selecting single-bit-units in accordance with one of the following conditions:

(a) single-bit-units containing 0 are selected for rearrangement when dual-bit-units containing 11 are selected, and
(b) single-bit-units containing 1 are selected for rearrangement when dual-bit-units containing 00 are selected;

assigning pulses of different amplitudes to the dual-bit-units of a selected set, where for each dual-bit-unit a corresponding pulse is generated while for each single-bit-unit the pulse is returned to zero;

shaping the pulses prior to transmission so as to minimize the occurrence of an inter-symbol interference and interfering harmonics; and transmitting the shaped pulses over a communication channel to a receiving station;

the receiving station comprising the step of:
converting the transmitted shaped pulses into the original binary data train of 0 data bits or 1 data bits with the aid of a synchronized clock signal.

25. The method of claim 24, wherein the step of converting the transmitted shaped pulses into the original binary data train comprises the step of synchronizing a clock generator after a predetermined number of data bits, and wherein at least one synchronizing pulse at a time is transmitted, by which the clock generator is synchronized.

26. The method of claim 24, wherein the transmitting step comprises transmitting the shaped pulses over a radio network.

27. The method of claim 26, wherein the step of transmitting the shaped pulses comprises transmitting shaped pulses over the radio network having a carrier frequency that is frequency modulated in accordance with a signal shape and amplitude of the transmitted shaped pulses.

28. The method of claim 26, wherein the step of transmitting the shaped pulses comprises transmitting shaped pulses over the radio network having a carrier frequency that is phase modulated in accordance with a signal shape and amplitude of the transmitted shaped pulses.

* * * * *